United States Patent
Kamel et al.

(10) Patent No.: US 6,993,787 B1
(45) Date of Patent: Jan. 31, 2006

(54) PROVIDING VCR FUNCTIONALITY FOR DATA-CENTERED VIDEO MULTICAST

(75) Inventors: Ibrahim M. Kamel, Monmouth Junction, NJ (US); Sarit Mukherjee, Lawrenceville, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/578,739

(22) Filed: May 25, 2000

Related U.S. Application Data (63) Continuation of application No. PCT/US99/25422, filed on Oct. 28, 1999.

(60) Provisional application No. 60/106,167, filed on Oct. 29, 1998.

(51) Int. Cl.
H04N 7/173 (2006.01)

(52) U.S. Cl. .............. 725/94; 725/87; 725/88; 725/100; 725/101; 725/102; 725/104

(58) Field of Classification Search ............... 725/87, 725/88, 94, 100, 101, 102, 104
See application file for complete search history.

(56) References Cited

U.S. PATENT DOCUMENTS

| | | | | |
|---|---|---|---|---|
| 4,949,187 A | * | 8/1990 | Cohen ..................... 386/69 |
| 5,357,276 A | * | 10/1994 | Banker et al. .............. 725/102 |
| 5,371,532 A | * | 12/1994 | Gelman et al. ............... 725/88 |
| 5,440,336 A | * | 8/1995 | Buhro et al. .................. 725/93 |
| 5,751,336 A | * | 5/1998 | Aggarwal et al. ......... 725/146 |
| 5,761,417 A | * | 6/1998 | Henley et al. .............. 709/231 |
| 5,764,893 A | * | 6/1998 | Okamoto et al. .......... 709/231 |
| 5,774,186 A | * | 6/1998 | Brodsky et al. ............ 348/553 |
| 5,793,412 A | * | 8/1998 | Asamizuya ................. 725/115 |
| 5,793,971 A | * | 8/1998 | Fujita et al. ................. 725/101 |
| 5,815,146 A | * | 9/1998 | Youden et al. .............. 715/720 |
| 5,818,439 A | * | 10/1998 | Nagasaka et al. ............. 725/87 |
| 5,831,662 A | * | 11/1998 | Payton ....................... 725/122 |
| 5,874,986 A | * | 2/1999 | Gibbon et al. .............. 725/134 |
| 5,930,493 A | | 7/1999 | Ottesen et al. |
| 5,959,690 A | | 9/1999 | Toebes, VIII et al. |
| 5,963,202 A | | 10/1999 | Polish |
| 5,990,881 A | * | 11/1999 | Inoue et al. ................. 345/720 |
| 6,018,359 A | * | 1/2000 | Kermode et al. ........... 725/101 |
| 6,025,868 A | * | 2/2000 | Russo ......................... 725/104 |
| 6,130,869 A | * | 10/2000 | Tokoro et al. ........... 369/47.33 |
| 6,295,603 B1 | * | 9/2001 | Mischo .......................... 713/2 |
| 6,543,053 B1 | * | 4/2003 | Li et al. ....................... 725/88 |
| 6,588,015 B1 | * | 7/2003 | Eyer et al. .................... 725/89 |

(Continued)

OTHER PUBLICATIONS

Dan, Asit; Sitaram, Dinkar; and Shahabuddin, Perwez; Scheduling Policies for an On-Demand Video Server with Batching; ACM, 1994; pp. 15-23.

(Continued)

*Primary Examiner*—Hai Tran
*Assistant Examiner*—Son P. Huynh
(74) *Attorney, Agent, or Firm*—Harness, Dickey & Pierce, PLC (57) ABSTRACT

The client application provides VCR functionality in a data-centered video multicast network (36) through active prefetching of the fragments from broadcast channels. The player (10) has a user interface (12) that supports a plurality of VCR functions (14–26). Plural buffers (32) and their associated loaders (34) download video data under control of a manager module (38). The manager module accesses the playback pointer (40) and employs feasible point calculation module (42) to cause the loaders to selectively download segments so that VCR functions can be supported while maintaining continuous playback after the VCR function is performed.

8 Claims, 5 Drawing Sheets

U.S. PATENT DOCUMENTS

2003/0149988 A1 *  8/2003  Ellis et al. ..................... 725/87

OTHER PUBLICATIONS

Aggarwal, Charu C.; Wolf, Joel L.; and Yu, Philip S.; On Optimal Batching Policies for Video-on-Demand Storage Servers; Multimedia, 1996, pp. 253-258.

Almeroth, Kevin C.; Ammar, Mostafa H.; On the use of Multicast Delivery to Provide a Scalable and Interactive Video-on-Demand Service; Networking and Telecommunications Group, Georgia Institute of Technology, Atlanta, Georgia; Jan. 10, 1996, pp. 1-23.

Bowen, T.F.; Gopal, G.; Herman, G.; Hickey, T.; Lee, K.C.; Mansfield, W.H.; Raitz, J. and Weinrib, A.; The Datacycle Architecture; Communications of the ACM, Dec. 1992; vol. 35, No. 12, pp. 71-81.

Pasquale, J.; Polyzos, G.; Anderson, E.; and Kompella, V.; The Multimedia Multicast Channel; Computer Systems Laboratory, Department of Computer Sckience and Engineering, University of California, San Diego.

Hua, Kien A.; and Sheu, Simon; Skyscraper Broadcasting: A New Broadcasting Scheme for Metropolitan Video-on-Demand Systems; Department of Computer Science, University of Central Florida, Orlando, Florida.

Liao, Wanjiun; and Li, Victor O.K.; The Split and Merge Protocol for Interactive Video-on-Demand; IEEE, 1997; pp. 51-62.

Hua, Kien A.; Cai, Ying; and Sheu, Simon; Patching: A Multicast Technique for True Video-on-Demand Services; ACM Multimedia, 1998; pp. 191-200.

Abram-Profeta, Emmanuel L.; and Shin, Kang G.; Providing Unrestricted VCR Functions in Multicast Video-on-Demand Servers; IEEE, 1998; pp. 66-75.

Bestavros, Azer; Using Speculation to Reduce Server Load and Service Time on the WWW; ACM, 1995; pp. 403-410.

Padmanabhan, Venkata N.; Improving World Wide Web Latency; Computer Science Division, University of California at Berkeley; May, 1995; Report No. UCB/CSD-95-875; pp. 1-24.

Crovella, Mark; and Barford, Paul; The Network Effects of Prefetching; Computer Science Department, Boston University, MA.

Gao, Lixin; Kurose, Jim; and Towsley, Don; Efficient Schemes for Broadcasting Popular Videos; Department of Comuter Science; Smith College, Northampton, MA and University of Massachusetts, MA.

* cited by examiner

PROVIDING VCR FUNCTIONALITY FOR DATA-CENTERED VIDEO MULTICAST

This is a continuation of patent application PCT International Ser. No. 09/25422, filed Oct. 28, 1999, which claims benefit of Provisional application Ser. No. 60/106,167, filed Oct. 29, 1998.

BACKGROUND AND SUMMARY OF THE INVENTION

The present invention relates generally to video on-demand multicasting. More particularly, the invention relates to a technique for providing VCR functionality (e.g., play, pause, fast forward, rewind, jump) in a data-centered video multicast or broadcast network.

Video on-demand service promises to create an entire new dimension in home entertainment possibilities. Whereas current pay-per-view broadcasts are confined to specific broadcast times, video on-demand relaxes adherence to strict schedules. Customers are able to request a specific video, selected from a database of choices, and have the video delivered essentially instantaneously or, in the worse case, after only a brief delay.

It is recognized that most requests for videos are from a small group of the currently most popular movies. Using multicast to send these movies is an efficient way to satisfy customer demand. Currently there are two basic approaches to providing multicast video on-demand. In the user-centered approach, the server allocates channels to one user or to a group of users and then sends the movie over the allocated channel or channels. In early unicast systems (a special case of multicast, with one user per group) a single channel was allocated for each user. More recent multicast systems allocate one channel to support several users.

In the data-centered approach, the server allocates channels to a movie or to a part of a movie. Through periodic broadcasts, a given channel broadcasts a movie repeatedly in cycles. Conventionally there are several different schemes for broadcasting in the data-centered paradigm. Pyramid broadcasting divides a movie into segments of exponentially increasing size and lets each channel broadcast each segment repeatedly. The segment is broadcast in the channel at a faster speed than playback speed. Skyscraper broadcasting modifies the pyramid approach, using a different distribution of segment sizes and broadcasting at the same speed as playback speed. Skyscraper broadcasting places an upper bound on the maximum weight of the segment size. This is done to reduce storage requirements at the client side (user). The number of multicast channels required does not depend on the number of requests from users. Thus the data-centered approach appears to be more scalable than the user-centered approach.

The multicast approach to supplying video on-demand from several users at one time, to some extent, sacrifices special requirements of each individual user. The multicast systems usually require the client to wait for a certain period before it can be served. This is referred to as the startup latency for the services. VCR functions such as pause, fast forward, fast rewind and jump to new location are difficult to provide in data-centered multicast systems. Although there have been attempts to provide VCR functionality, the solutions offered to date have not been able to provide scalability while at the same time guaranteeing seamless delivery. Typically, as the size of the system is scaled up, it becomes increasingly more difficult to provide seamless operation. Thus users experience jumpiness or breaks in delivery that detract from the enjoyment of the system. The present invention proposes a new scheme which can provide VCR functionality in data-centered multicast video on-demand systems. The scheme is scalable and is far more able to guarantee smooth, discontinuity-free delivery. The system employs separate buffers at each client, from which media content may be played back to support VCR functionality. A loader associated with each buffer downloads segments of the video stream from the video data server under control of a pre-fetch manager that intelligently determines what to pre-fetch into the buffer. The pre-fetch manager does this by monitoring the playback position pointer and controls the pre-fetching operation to maintain the playback position pointer within a predetermined range within the buffer.

The system also employs a calculation of feasible points based on a set of predefined rules. These feasible points are used in determining which operations are performed in a seamless fashion and also to identify when seamless operation may not be possible. In the latter case, appropriate user-friendly performance is initiated so that the user does not experience undue jerkiness or long delays or gaps in media delivery.

For a more complete understanding of the invention, its objects and advantages, refer to the following specification and to the accompanying drawings.

DESCRIPTION OF THE PREFERRED EMBODIMENT

Figure 1:
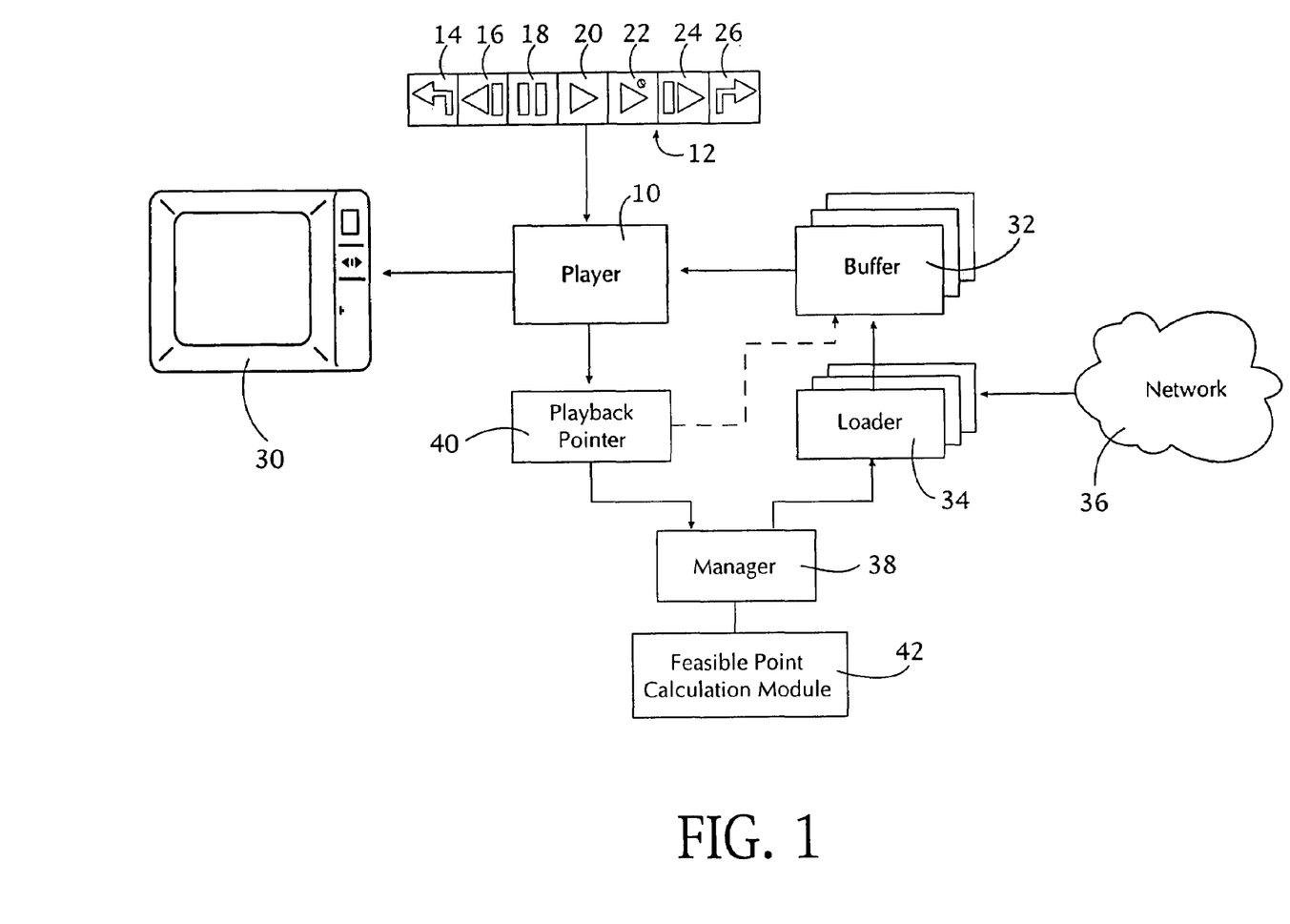
FIG. 1 is block diagram of the presently preferred embodiment for providing VCR functionality.

A presently preferred embodiment of the system is illustrated in FIG. 1. The system includes a player module 10 that provides an associated user interface 12 by which the user can select among a set of VCR functions. Illustrated in FIG. 1 are the following functions: jump backward 14, fast rewind 16, pause 18, play 20, slow motion play 22, fast forward 24 and jump forward 26. These VCR functions are exemplary of the type of functions that may be provided in a consumer product. Of course, other functions may also be provided, if desired.

For instance, a jog shuttle mechanism may be provided to allow the user to move forward or backward through successive frames of the video content. Also note that a stop function may also be included. However, in the presently preferred implementation, the pause function 18 provides nearly the same functionality as a stop function would. This is so because, unlike in a mechanical VCR, there is no requirement to unload the tape from the tape head or to halt the tape drive motors and capstan. Nevertheless, if desired, both pause and stop functions may be included, in which case the pause function might provide a freeze-frame function while the stop function would blank the screen, for example.

Player 10 accepts VCR commands from the user interface and plays back the video stream through a suitable monitor 30. Player 10 obtains the video stream from one or more buffers 32. In the presently preferred embodiment there is a loader module 34 associated with each buffer. The loader module is responsible for interfacing with the distribution network 36 to download the required video content, as will be more fully described below.

The loader modules are controlled by a manager module 38 that is responsible for implementing the selective downloading strategy of the system. As will be more fully described below, the manager is able to access the playback pointer 40 of player 10. This pointer shows the current playback location within the buffer 32 that is currently supplying the video stream to the player for display on the monitor 30. The manager module 38 includes a feasible point calculation module or calculation processor 42 that is responsible for assessing which user-requested functions may result in discontinuous service. The feasible point calculation module thus supplies manager 38 with the information needed to interpret the user's request in a modified fashion if the original request would result in undesirable playback (e.g., jumpy or discontinuous playback or long delay).

When the client wishes to download video segments from a broadcast channel on network 36, the manager 38 of the preferred embodiment causes loaders 34 to load information into the buffers in two phases. The first phase is a pyramid phase (unequal segments) during which all loaders are used to download information to guarantee smooth playback in the normal forward direction. Once the buffers 32 have been loaded to support the initial forward play mode, manager 38 gradually phases the loaders 34 into the equal segment phase. In the equal segment phase, some of the segments may be fetched to support playback of backward segments (i.e., content that precedes the current playback pointer).

The manager selects the channels and segments to be loaded based on the current playback segment, as designated by the playback pointer 40. The manager 38 assigns priority to each segment based on its proximity to the current segment and also based on whether loading is in the initial pyramid phase or in the later equal segment phase.

To illustrate, assume the current segment is k. If k is one of the pyramid phase segments, the first three segments in the forward direction (k, k+1, k+2) are assigned the highest priority. If k is one of the equal phase segments, the highest priority segments are the current segment k and those that immediately precede and follow it (k, k+1, k−1). The priorities of the remaining segments are determined by their distance from the current segment. The nearer to the current segment the higher its priority. In case of ties, the tie is broken in favor of the segment in the forward direction. If there are more than three loaders and buffers, allocation is based on the priority of the segment.

We will further consider here the special case where there are only three loaders and buffers. In this case manager 38 allocates or reallocates the loaders into situations: (a) startup and (b) after performing a VCR action.

In the startup situation the playback pointer lies at the boundary of the first segment to be played. Note that the boundaries of all segments are also boundaries of the first segment at startup. At this boundary both de-allocation and allocation can occur. If a loader finishes loading a segment, it is returned to the free loader pool (de-allocation). This de-allocation process is voluntary by the loader. Allocation can also occur after de-allocation.

During the pyramid phase, the three loaders are allocated to the next unassigned segments in line. During the equal segment phase, if the play point is in the earlier half of the current segment (the current segment being designated segment k), the three loaders are assigned to segments k−1, k, k+1. If the play point is in the latter half of the current segment, the three loaders are assigned to segments k, k+1, k+2. If the contents of the segment to be played is already in the buffer no loading occurs for that segment. Later downloading segments may overwrite earlier segments already in the buffer. However, if the playpoint is in to-be-overwritten segment in the buffer, the manager 38 prevents it from being overwritten beyond the playpoint. We call this playpoint protection.

In the second situation (after every VCR action is performed) a somewhat different sequence proceeds. During the pyramid phase, the manager checks whether the loaders are assigned to k, k+1, k+2. If this is the case, no actions are taken. Otherwise, the manager will enforce preemptively the assignment. During the equal segment phase, if the playpoint is inside the buffer, no actions are taken. The relative position of the playpoint is adjusted when the downloading point (channel broadcast point) comes to the boundaries of the equal segments. If the playpoint goes outside the buffer (the current segment assumed to be k), the manager reallocates the loaders to segments k, k+1 and k−1. This may cause an involuntary de-allocation of loaders.

The manager 38 of the preferred embodiment controls the loading of buffers 32, based on the playback pointer 40, striving to maintain the playback pointer within a predetermined range within the buffer. In the presently preferred embodiment, the manager causes information to be fetched and stored in the buffers so that the playback pointer remains at or near the center of the buffer after the initial pyramid phase loading is completed. Doing this allows the system to provide continuous VCR functionality with a very high probability that the user's request can be smoothly carried out. In contrast with other schemes, the present system empowers the client to actively pre-fetch nearby frames around the playback point and to locally manufacture the contents required to implement most VCR actions by appropriately accessing the local buffers 32.

Figure 2:
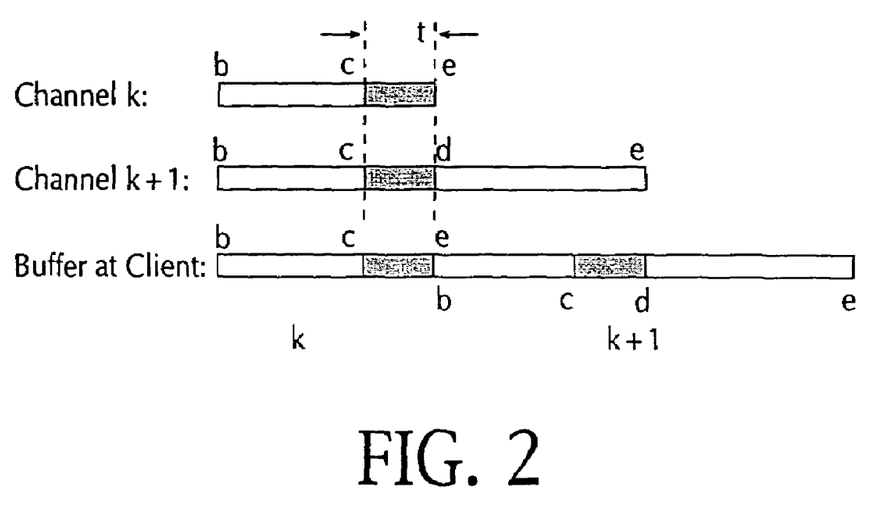
FIG. 2 illustrates a first broadcasting scenario, demonstrating how discontinuity occurs in the case of an unrestricted jump.

To account for situations in which a user's VCR command may not be feasible, manager 38 includes a feasible point calculation module 42. The preferred implementation employs a set of rules to decide whether a given destination point is feasible or not, and how to respond accordingly. To provide high quality VCR functionality and seamless playback, the system strives to guarantee that the user can jump to a desired destination point p and then resume normal playback to the end of the movie without discontinuity. Given the particular channel broadcasting situation and the buffer conditions at the client, not all points are feasible points. For example, as illustrated in FIG. 2, an unrestricted jump can lead to discontinuities of later playback even if there is no subsequent VCR action. As FIG. 2 illustrates, assume that a user issues a VCR action to jump to position c of segment k outside of the client's buffer and that the channel k happens to broadcast at point c. If the jump is allowed, after an elapse of time t, the buffer will only have $c_k$ $e_k$ and $c_{k+1}$ d, however the client needs to playback from $e_k$ (or $b_{k+1}$) to $c_{k+1}$, which is not available and results in discontinuous playback.

Figure 3:
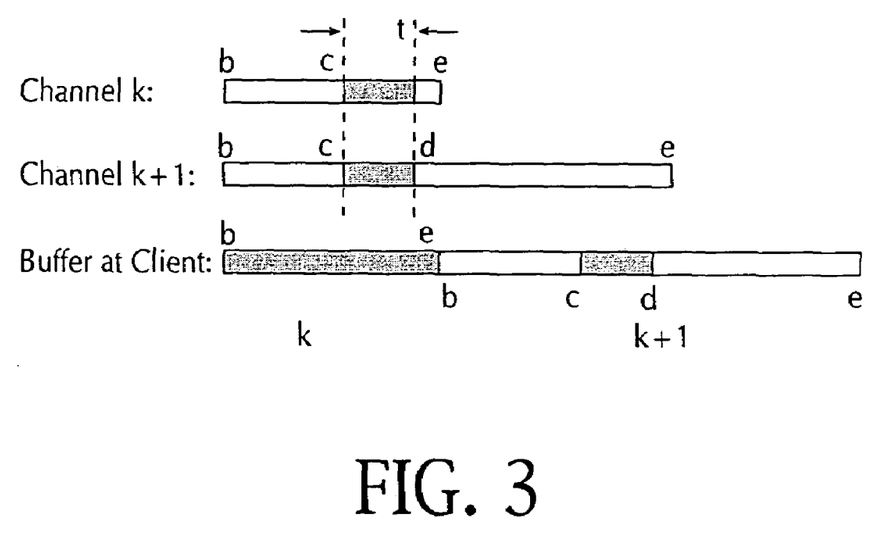
FIG. 3 illustrates a similar broadcasting scenario, showing how discontinuity can occur in the case of a fastforward action.

Even if the video frame contents are in the buffer, some VCR actions can lead to discontinuity after normal play is resumed. FIG. 3 illustrates this. In FIG. 3 a fastforward action is initiated. Assume that the channel broadcasting point is $c_i$ for channel i. The contents of channel k are in the buffer and contents of channel k+1 are not in the buffer. The current playback point is bk. If a fastforward command is issued with length of $e_k$ $e_k$, all the contents are in the buffer. Assume that the fastforward of this length takes time t. If the system performs this action to the full length, it will take time t to the playback position of $e_k$. At this point, only $b_k$ $e_k$ and $c_{k+1}$ d in the buffer, but $b_{k+1}$ $c_{k+1}$ is needed to continue normal play and is not available.

To address the issues illustrated in FIGS. 2 and 3, the feasible point calculation module determines whether a given point is feasible or not and then determines how to find the nearest point that is feasible. The presently preferred embodiment distinguishes three following cases according to the relative size of the segments involved.

Assume that the size of segment i is $s_i$. The beginning position and end position of segment i and $b_i$ and $e_i$, respectively. We assume that $b_i=0$ for all $1 \leq i \leq K$. At any time each channel is broadcasting a specific frame in the segment. This point is denoted as $c_i$ and we have $b_i \leq c_i \leq e_i$.

If the destination point p is located at or before the channel point $c_i$, we call the segment containing the desired destination current segment and we assume it is segment k and broadcast in channel k. First we give the rules for this case. After that, we consider the cased in which the destination point p is located after the channel point $c_i$.

Case 1 (FIG. 4): $S_k=S_{k+1}$. This is the case in which the size of the current segment is equal to the size of the next segment. It is abbreviated as (x, x) case.

Figure 4:
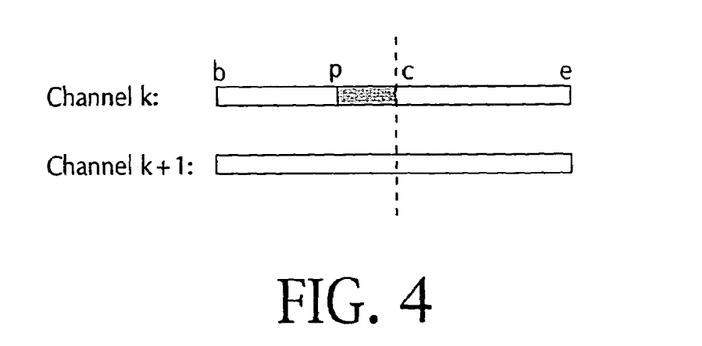
FIG. 4 illustrates Case 1 of the presently preferred set of rules for assessing feasible points.

If $pc_k$ is in the buffer, then p is feasible; otherwise, the later nearest feasible point is the point q such that $qc_k$ are in the buffer with the smallest q value.

Figure 5:
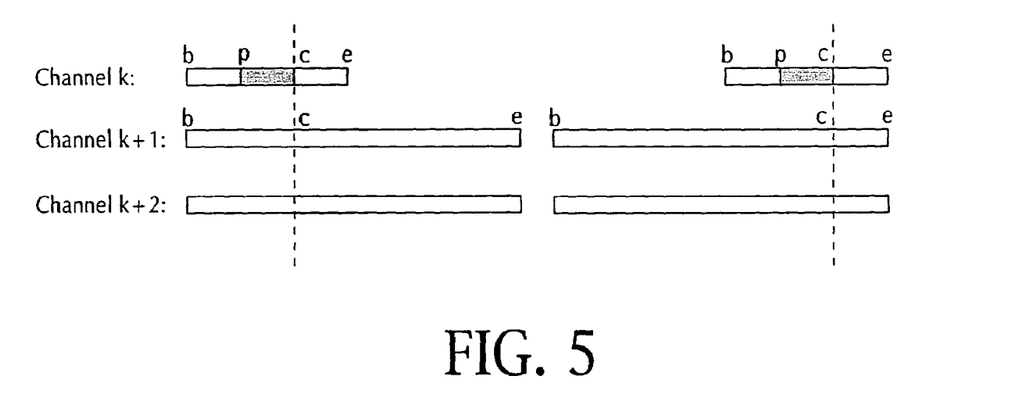
FIG. 5 illustrates Case 2 of the presently preferred rules for determining feasible points.

Case 2 (FIG. 5): $S_{k+1}=2*S_k$ and $S_{k+2}=S_{k+1}$. This is the case in which the size of the current segment is half of the size of the next segment and the next two segments are of equal size. It is abbreviated as (x, 2x, 2x) case.

case 2.1 $c_k=C_{k+}$. This is case in which the broadcasting position of channel k is the same as channel k+1, or they are left aligned.

If $pc_k$ and $b_{k+1}c_{k+1}$ are in the buffer, then p is feasible: otherwise, if $b_{k+1}c_{k+1}$ is in the buffer, the later nearest feasible point is the point q such that $qc_k$ are in the buffer with the smallest q value; if $b_{k+1}c_{k+1}$ is not in the buffer, the later nearest feasible point is the point q such that $qc_{k+1}$ are in the buffer with the smallest q value;

case 2.2 $c_k \neq C_{k+1}$. This is case in which the broadcasting position of channel k is not the same as channel k+1, or they are left aligned.

If $pc_k$ is in the buffer, then p is feasible; otherwise, the later nearest feasible point is the point q such that $qc_k$ are in the buffer with the smallest q value.

Figure 6:
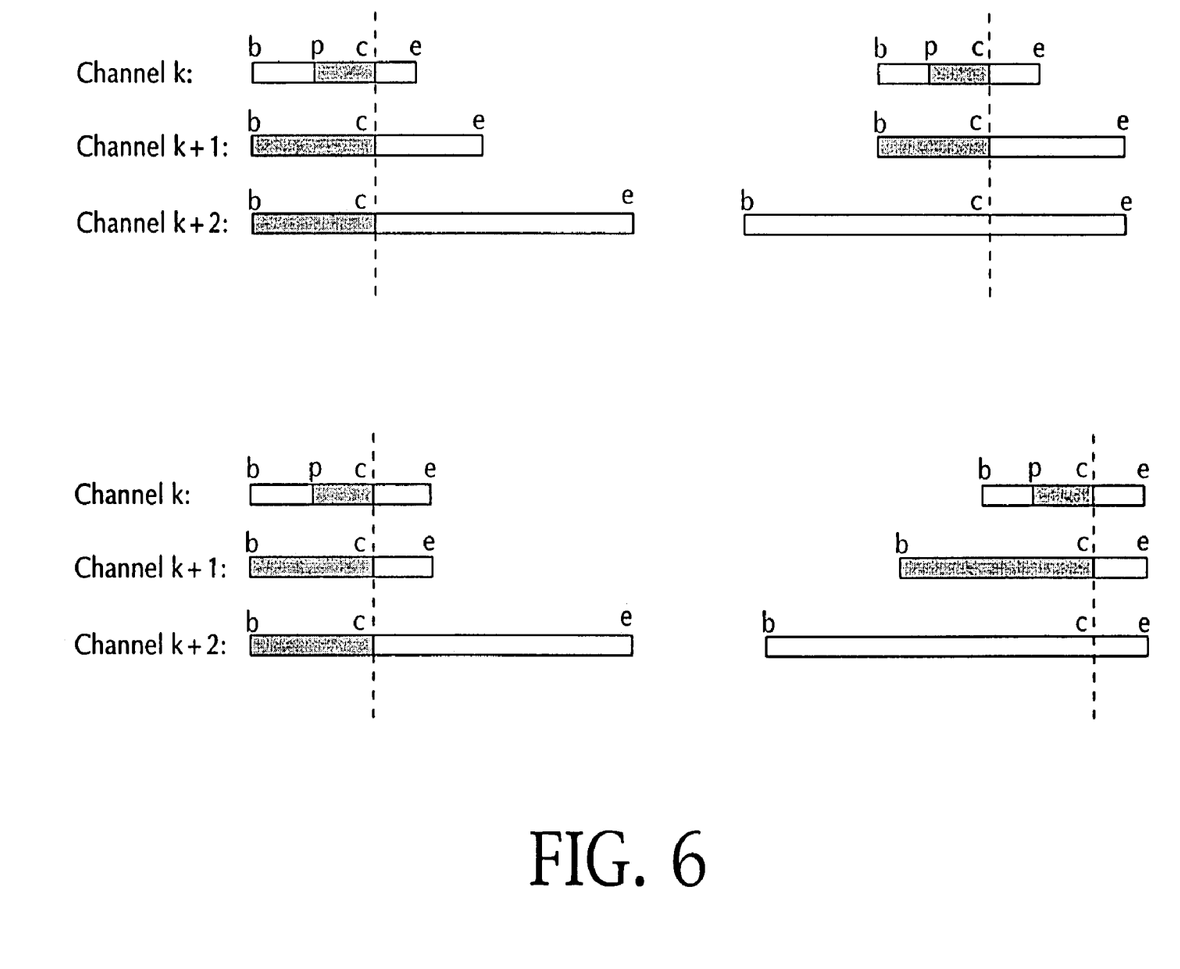
FIG. 6 illustrates Case 3 of the presently preferred rules for assessing feasible points.

Case 3 (FIG. 6): $S_{k+1}=2* S_{k+1}$ and $S_{k+2}=2* S_{k+1}$. This is the case in which the size of the current segment is half of the next segment and the size of next segment is in turn half of the size of its next segment. It is abbreviated as (x, 2x, 4x) case.

case 3.1 $c_k=C_{k+1}=c_{k+2}$. This is case in which the broadcasting position of channels k, k+1 and k+2 are the same, or they are left aligned.

If $pc_k$, $b_{k+1}c_{k+1}$ and $b_{k+2}c_{k+2}$ are in the buffer, then p is feasible; otherwise, if $b_{k+1}c_{k+1}$ and $b_{k+2}c_{k+2}$ are in the buffer, the later nearest feasible point is the point q such that $qc_k$ are in the buffer with the smallest q value; if $b_{k+2}c_{k+2}$ is in the buffer and $b_{k+1}c_{k+1}$ is not all in the buffer, the later nearest feasible point is in the point q such that $qc_{k+1}$ is in the buffer with the smallest q value: if $b_{k+1}c_{k+1}$ is not in the buffer, the later nearest feasible point is the point q such that $qc_{k+2}$ is in the buffer with the smallest q value:

case 3.2 $c_k=C_{k+1} \neq c_{k+2}$. This is case in which the broadcasting position of channels k, k+1 are the same, but not the same as that of channel k+2.

If $pc_k$, $b_{k+1}c_{k+1}$ are in the buffer, then p is feasible; otherwise, if $b_{k+1}c_{k+1}$ is in the buffer, the later nearest feasible point is the point q such that $qc_k$ is in the buffer with the smallest q value; if $b_{k+1}c_{k+1}$ is not all in the buffer, the later nearest feasible point is the point q such that $qc_{k+1}$ is in the buffer with the smallest q value: if $b_{k+1}c_{k+1}$ is not in the buffer, the later nearest feasible point is the point q such that $qc_{k+1}$ is in the buffer with the smallest q value.

case 3.3 $c_k \approx C_{k+1} \approx c_{k+2}$. This is case in which the broadcasting position of channels k+1, k+2 are the same, but not the same as that of channel k.

If $pc_k$, $b_{k+2}c_{k+2}$ are in the buffer, then p is feasible; otherwise, if $b_{k+2}c_{k+2}$ is in the buffer, the later nearest feasible point is the point q such that $qc_k$ is in the buffer with the smallest q value; if $b_{k+2}c_{k+2}$ is not all in the buffer, the later nearest feasible point is the point q such that $qc_{k+2}$ is in the buffer with the smallest q value.

case 3.4 $c_k \approx C_{k+1} \approx c_{k+2}$. This is case in which the broadcasting position of channels k, k+1 and k+2 are all different, or they are all right-aligned.

If $pc_k$ is in the buffer, then p is feasible; otherwise, the later nearest feasible point is the point q such that $qc_k$ are in the buffer with the smallest q value.

If the destination point p is located after the channel point $c_i$, the next segment to the one that contains the desired destination is called the current segment. We assume it is segment k. In this situation, $pc_k$ means $pe_{k-1}$ and $b_k c_k$. After this modification, we can use the above rules.

Figure 7:
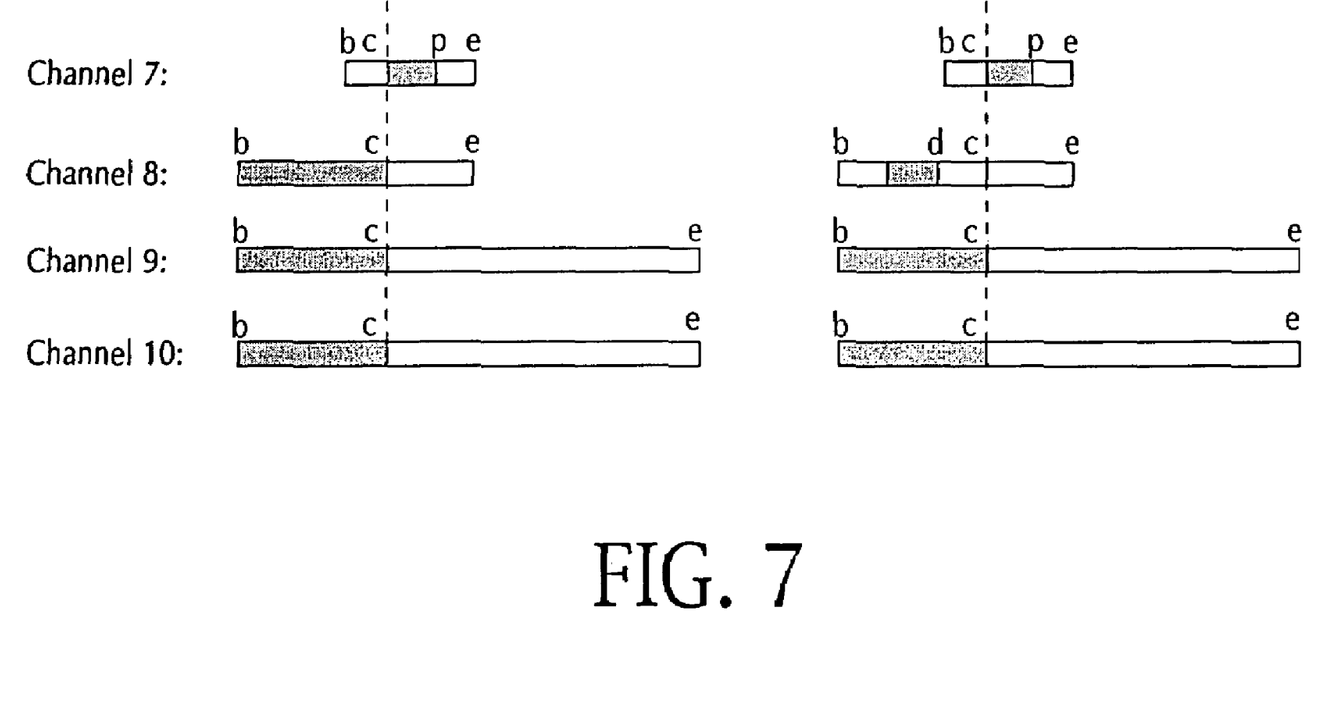
FIG. 7 is an example showing how the feasible point analysis is performed in accordance with the presently preferred embodiment.

FIG. 7 shows an example how to determine the feasible point in this case. Assume the destination point is p, which is later than the broadcasting point $c_7$. So the current segment should be k=8. Since the segment size of current segment is half next segment and next two segments are of equal size, this is the case 2.1 of the above rule. As stated above, we use $pc_k$ to represent $pe_7$ and $b_8 c_8$. According to the rule 2.1, p is a feasible point in case (a). In case (b), p is not a feasible point and the nearest feasible point is d because $b_{k+1}c_{k+1}$ is in the buffer and d is the smallest value such that $dc_k$ is in the buffer.

The feasible point calculations, described above, allow the user to specify an arbitrary destination within the video-on-demand data stream. The system automatically adjusts the destination to a nearby feasible point, if the point requested by the user is not feasible. Thus, when the destination is not in the buffer, only those destination frames that are being broadcast at each channel are available immediately. The feasible point calculation module assesses what is possible and selects the nearest frame among those available as the adjusted destination if the requested destination cannot be met. If the feasible point calculation module determines that the requested frame is feasible, we call this an allowed destination. If the feasible point calculation module determined that the requested frame cannot be met without discontinuity, it substitutes a different frame that can be met. We call this the adjusted destination.

One desirable property of the destination, either allowed or adjusted, is that once the client resumes normal play from this destination, the client is able to playback to the end of the video without experiencing interruptions, provided there are no further VCR actions.

In developing an actual embodiment of the invention, the system designer may wish to specify the number of buffers used at each client. To implement a robust VCR-oriented scheme, two conditions should be preferably met:

(1) If the destination segment is not in the buffer, and we still require that we can always select the frame being broadcast at this channel as the destination, the segments sized must be equal to the size of the next segment in order to guarantee that the client can playback the next segment when it finishes playing the current segment.

(2) The sizes of all segments beginning from the latter of these two equal segments must satisfy the continuity condition that guarantees smooth playback of the remainder of the video will be possible, assuming the client can download from m channels simultaneously.

Equation 1 below presents the function f(n) that will satisfy the above two conditions. The equation assumes that a client can download from m channels simultaneously.

$$f(n) = 2^{n - \lceil \frac{n}{m} \rceil}$$ Equation 1

As an example, we give below the series generated by f(n) with m=5:

1, 2, 4, 8, 16, 16, 32, 64, 128, 256, 256, 512, 1024, 2048, 4096, . . .

In designing a system, the value of m (simultaneously available channels) places a minimum requirement on the bandwidth needed at each client. Considering the heterogeneity of the client, we like m to be small. On the other hand, in order to pre-fetch nearby segments of the current playback segment, clients download both the next segment for forward VCR action and the previous segment for backward VCR action. These segments are fetched in addition to the current segment. Thus in the presently preferred embodiment the value of m is preferably 3 or greater. If fewer than 3 channels are available simultaneously, then the system will have to sacrifice in supporting forward or backward VCR functionality. Thus in the preceding example, we have used m=3 to illustrate both forward and backward VCR functionality. Of course, in a practical implementation, the value selected for m can be greater than 3 while still preserving the benefit of supporting both forward and backward action.

Given that the series dictated by Equation 1 is monotonically increasing and is bounded by f(u)=f(K), we determine the buffer requirement for a client to be the size of the largest segment minus one size unit. Thus the buffer requirement may be expressed as a function of f(n) as follows:

$$\text{Buffer} = \frac{f(u)xL}{\sum_{n=1}^{K} f(n)}.$$ Equation 2

In operation, when a client downloads video segments from the broadcast channels, we shall assume that at the outset no VCR functions are invoked and the video is to proceed at the beginning of the program. At the beginning, three loaders wait until the boundary of the first segment is detected. This waiting time is the startup latency and the maximum waiting time will be the time required to playback the first segment. The first loader begins to download from the first channel and contents of its buffer are played. The other two loaders are assigned to the second and third channels, respectively. Depending on the relative positions of each channel, the loader may download from the second channel at the beginning or at the end of the first segment. Similarly, the loader may download from the third channel at the beginning or end of the second segment. When the contents of the buffers are played they are immediately discarded. Whenever a loader finishes downloading the assigned channel, it is assigned to the next immediate unassigned channel. It begins downloading from the channel when the length of the contents in its buffer is less than the assigned channel segment size. This guarantees that downloading of a segment is delayed as much as possible to save buffer space, but it also guarantees smooth playback of that segment.

The foregoing system is thus able to provide smooth, continuous playback while supporting all popular VCR functions. While the invention has been described in its presently preferred embodiments, it will be understood that the invention is capable of modification without departing from the spirit of the invention as set forth in the appended claims. For example, the number of buffers employed at a client location can vary. Also, the number of loaders used to service the buffer population can also vary. While a one-to-one correspondence between buffers and loaders is presently preferred, some implementations may be able to provide adequate throughput with fewer loaders than buffers.

What is claimed is:

1. A Video-on Demand client system to prefetch segments of video data streams through multiple communications channels of data-centered broadcasting network from a video data server for implementing VCR functions including at least playback the segments, said client system comprising:

at least one loader to download the segments of the video stream from the video data server;

at least one buffer to store the downloaded segments from said loader;

a player to playback the segments read from said buffer, said player being responsive to VCR function commands given through user-interface thereof;

a playback pointer to issue playback commands to said player for designating a playback starting point of the segment in said buffer; and a prefetch manager to issue prefetch commands to said loader for prefetching the segments from the server based on the current playback point of the segment in said buffer so as to keep the playback point designated by said pointer within predetermined range of said buffer, wherein according to size of the broadcasting segment through the channels of the network from the server to the client, said playback pointer designates the feasible playback starting point for a destination frame point p of the segment designated by VCR function commands, where k is defined as natural number;

b(k) is defined as a beginning frame point of segment No. k;

e(k) is defined as an end frame point of segment No. k;

c(k) is defined as a current broadcasting frame point of segment No. k;

K is defined as numbers of channels and divided into segments of a set of video data streams of each video of length;

point value of b(k) equals to 0, (1<=k<=K);

condition (a): the destination point p is located at or before broadcasting point c(k) of the segment k broadcasting in channel k; and condition (b): the size of the current broadcasting segment k equals to the size of next segment k+1, wherein when the conditions (a) and (b) are satisfied, if frames between the destination point p and c(k) are in the buffer, then the point p is the feasible point, otherwise the later nearest point q that frames between points of q and c(k) are in the buffer is the feasible point having smallest point value.

2. A Video-on Demand client system to prefetch segments of video data streams through multiple communications channels of data-centered broadcasting network from a video data server for implementing VCR functions including at least playback the segments, said client system comprising:

at least one loader to download the segments of the video stream from the video data server;

at least one buffer to store the downloaded segments from said loader;

a player to playback the segments read from said buffer, said player being responsive to VCR function commands given through user-interface thereof;

a playback pointer to issue playback commands to said player for designating a playback starting point of the segment in said buffer; and a prefetch manager to issue prefetch commands to said loader for prefetching the segments from the server based on the current playback point of the segment in said buffer so as to keep the playback point designated by said pointer within predetermined range of said buffer, wherein according to size of the broadcasting segment through the channels of the network from the server to the client, said playback pointer designates the feasible playback starting point for a destination frame point p of the segment designated by VCR function commands, where k is defined as natural number;

b(k) is defined as a beginning frame point of segment No. k;

e(k) is defined as an end frame point of segment No. k;

c(k) is defined as a current broadcasting frame point of segment No. k;

K is defined as numbers of channels and divided into segments of a set of video data streams of each video of length;

point value of b(k) equals to 0 as an offset value, (1<=k<=K);

condition (a): the destination point p is located at or before broadcasting point c(k) of the segment k broadcasting in channel k;

condition (c): the size of the current broadcasting segment k is half of size of the next segment k+1 and the size of the next two segments k+1 and k+2; and condition (d): the point value of c(k) equals to the point value of c(k+1), wherein when the conditions (a), (c) and (d) are satisfied, if both frames between the destination point p and c(k) and frames between the point b(k+1) and c(k+1) are in the buffer, then the point p is the feasible point, otherwise:

if frames between the points of b(k+1) and c(k+1) are in the buffer, then the later nearest point q that frames between q and c(k) is in the buffer is the feasible point having smallest point value, if frames between the points of b(k+1) and c(k+1) are not in the buffer, then the later nearest point q that frames between the points q and c(k+1) is in the buffer are the feasible point having smallest point value.

3. A Video-on Demand client system to prefetch segments of video data streams through multiple communications channels of data-centered broadcasting network from a video data server for implementing VCR functions including at least playback the segments, said client system comprising:

at least one loader to download the segments of the video stream from the video data server;

at least one buffer to store the downloaded segments from said loader;

a player to playback the segments read from said buffer, said player being responsive to VCR function commands given through user-interface thereof;

a playback pointer to issue playback commands to said player for designating a playback starting point of the segment in said buffer; and a prefetch manager to issue prefetch commands to said loader for prefetching the segments from the server based on the current playback point of the segment in said buffer so as to keep the playback point designated by said pointer within predetermined range of said buffer, wherein according to size of the broadcasting segment through the channels of the network from the server to the client, said playback pointer designates the feasible playback starting point for a destination frame point p of the segment designated by VCR function commands, where k is defined as natural number;

b(k) is defined as a beginning frame point of segment No. k;

e(k) is defined as an end frame point of segment No. k;

c(k) is defined as a current broadcasting frame point of segment No. k;

K is defined as numbers of channels and divided into segments of a set of video data streams of each video of length;

point value of b(k) equals to 0 as an offset value, (1<=k<=K);

condition (a): the destination point p is located at or before broadcasting point c(k) of the segment k broadcasting in channel k;

condition (c): the size of the current broadcasting segment k is half of size of the next segment k+1 and the size of the next two segments k+1 and k+2; and condition (e): the point value of c(k) does not equals to the point value of c(k+1), wherein when the conditions (a), (c) and (e) are satisfied, if both frames between the destination point p and c(k) are in the buffer, then the point p is the feasible point, otherwise the later nearest point q that frames between points of q and c(k) are in the buffer is the feasible point having smallest point value.

4. A Video-on Demand client system to prefetch segments of video data streams through multiple communications channels of data-centered broadcasting network from a video data server for implementing VCR functions including at least playback the segments, said client system comprising:

at least one loader to download the segments of the video stream from the video data server;

at least one buffer to store the downloaded segments from said loader;

a player to playback the segments read from said buffer, said player being responsive to VCR function commands given through user-interface thereof;

a playback pointer to issue playback commands to said player for designating a playback starting point of the segment in said buffer; and a prefetch manager to issue prefetch commands to said loader for prefetching the segments from the server based on the current playback point of the segment in said buffer so as to keep the playback point designated by said pointer within predetermined range of said buffer, wherein according to size of the broadcasting segment through the channels of the network from the server to the client, said playback pointer designates the feasible playback starting point for a destination frame point p of the segment designated by VCR function commands, where k is defined as natural number;

b(k) is defined as a beginning frame point of segment No. k;

e(k) is defined as an end frame point of segment No. k;

c(k) is defined as a current broadcasting frame point of segment No. k;

K is defined as numbers of channels and divided into segments of a set of video data streams of each video of length;

point value of b(k) equals to 0 as an offset value, (1<=k<=K);

condition (a): the destination point p is located at or before broadcasting point c(k) of the segment k broadcasting in channel k;

condition (f): the size of the current broadcasting segment k is half of size of the next segment k+1 and the size of the next segments k+1 is half of size of its next segment k+2; and condition (g): the point value of c(k) equals to the both point values of c(k+1) and c(k+2), wherein when the conditions (a), (f) and (g) are satisfied, if frames between the destination point p and c(k), frames between the point b(k+1) and c(k+1), and frames between the point b(k+2) and c(k+2) are in the buffer, then the point p is the feasible point, otherwise:

if frames between the point b(k+1) and c(k+1), and frames between the point b(k+2) and c(k+2) are in the buffer, then the later nearest point q that frames between q and c(k) is in the buffer is the feasible point having smallest point value, if frames between the points of b(k+1) and c(k+1) are not all in the buffer, and frames between the point b(k+2) and c(k+2) are in the buffer, then the later nearest point q that frames between q and c(k+1) is in the buffer is the feasible point having smallest point value, if frames between the points of b(k+1) and c(k+1) are not in the buffer, then the later nearest point q that frames between the points q and c(k+2) are in the buffer is the feasible point having smallest point value.

5. A Video-on Demand client system to prefetch segments of video data streams through multiple communications channels of data-centered broadcasting network from a video data server for implementing VCR functions including at least playback the segments, said client system comprising:

at least one loader to download the segments of the video stream from the video data server;

at least one buffer to store the downloaded segments from said loader;

a player to playback the segments read from said buffer, said player being responsive to VCR function commands given through user-interface thereof;

a playback pointer to issue playback commands to said player for designating a playback starting point of the segment in said buffer; and a prefetch manager to issue prefetch commands to said loader for prefetching the segments from the server based on the current playback point of the segment in said buffer so as to keep the playback point designated by said pointer within predetermined range of said buffer, wherein according to size of the broadcasting segment through the channels of the network from the server to the client, said playback pointer designates the feasible playback starting point for a destination frame point p of the segment designated by VCR function commands, where k is defined as natural number;

b(k) is defined as a beginning frame point of segment No. k;

e(k) is defined as an end frame point of segment No. k;

c(k) is defined as a current broadcasting frame point of segment No. k;

K is defined as numbers of channels and divided into segments of a set of video data streams of each video of length;

point value of b(k) equals to 0 as an offset value, (1<=k<=K);

condition (a): the destination point p is located at or before broadcasting point c(k) of the segment k broadcasting in channel k;

condition (f): the size of the current broadcasting segment k is half of size of the next segment k+1 and the size of the next segments k+1 is half of size of its next segment k+2; and condition (h): the point value of c(k) equals the point value of c(k+1) and does not equal c(k+2), wherein when the conditions (a), (f) and (h) are satisfied, if frames between the destination point p and c(k), and frames between the point b(k+1) and c(k+1) are in the buffer, then the point p is the feasible point, otherwise:

if frames between the point b(k+1) and c(k+1) are in the buffer, then the later nearest point q that frames between q and c(k) is in the buffer is the feasible point having smallest point value, if frames between the points of b(k+1) and c(k+1) are not all in the buffer, then the later nearest point q that frames between q and c(k+1) is in the buffer is the feasible point having smallest point value.

6. A Video-on Demand client system to prefetch segments of video data streams through multiple communications channels of data-centered broadcasting network from a video data server for implementing VCR functions including at least playback the segments, said client system comprising:

at least one loader to download the segments of the video stream from the video data server;

at least one buffer to store the downloaded segments from said loader;

a player to playback the segments read from said buffer, said player being responsive to VCR function commands given through user-interface thereof;

a playback pointer to issue playback commands to said player for designating a playback starting point of the segment in said buffer; and a prefetch manager to issue prefetch commands to said loader for prefetching the segments from the server based on the current playback point of the segment in said buffer so as to keep the playback point designated by said pointer within predetermined range of said buffer, wherein according to size of the broadcasting segment through the channels of the network from the server to the client, said playback pointer designates the feasible playback starting point for a destination frame point p of the segment designated by VCR function commands, where k is defined as natural number;

b(k) is defined as a beginning frame point of segment No. k;

e(k) is defined as an end frame point of segment No. k;

c(k) is defined as a current broadcasting frame point of segment No. k;

K is defined as numbers of channels and divided into segments of a set of video data streams of each video of length;

point value of b(k) equals to 0 as an offset value, (1<=k<=K);

condition (a): the destination point p is located at or before broadcasting point c(k) of the segment k broadcasting in channel k;

condition (f): the size of the current broadcasting segment k is half of size of the next segment k+1 and the size of the next segments k+1 is half of size of its next segment k+2; and condition (i): the point value of c(k) equals to the point values of c(k+2) and does not equal to c(k+1), wherein when the conditions (a), (f) and (i) are satisfied,
if frames between the destination point p and c(k), and frames between the point b(k+2) and c(k+2) are in the buffer, then the point p is the feasible point, otherwise:
if frames between the point b(k+2) and c(k+2) are in the buffer, then the later nearest point q that frames between q and c(k) is in the buffer is the feasible point having smallest point value,
if frames between the points of b(k+2) and c(k+2) are not all in the buffer, then the later nearest point q that frames between q and c(k+2) is in the buffer is the feasible point having smallest point value.

7. A Video-on Demand client system to prefetch segments of video data streams through multiple communications channels of data-centered broadcasting network from a video data server for implementing VCR functions including at least playback the segments, said client system comprising:

at least one loader to download the segments of the video stream from the video data server;

at least one buffer to store the downloaded segments from said loader;

a player to playback the segments read from said buffer, said player being responsive to VCR function commands given through user-interface thereof;

a playback pointer to issue playback commands to said player for designating a playback starting point of the segment in said buffer; and a prefetch manager to issue prefetch commands to said loader for prefetching the segments from the server based on the current playback point of the segment in said buffer so as to keep the playback point designated by said pointer within predetermined range of said buffer, wherein according to size of the broadcasting segment through the channels of the network from the server to the client, said playback pointer designates the feasible playback starting point for a destination frame point p of the segment designated by VCR function commands, where k is defined as natural number;

b(k) is defined as a beginning frame point of segment No. k;

e(k) is defined as an end frame point of segment No. k;

c(k) is defined as a current broadcasting frame point of segment No. k;

K is defined as numbers of channels and divided into segments of a set of video data streams of each video of length;

point value of b(k) equals to 0 as an offset value, (1<=k<=K);

condition (a): the destination point p is located at or before broadcasting point c(k) of the segment k broadcasting in channel k;

condition (f): the size of the current broadcasting segment k is half of size of the next segment k+1 and the size of the next segments k+1 is half of size of its next segment k+2; and condition (j): the point value of c(k) does not equal to the both point values of c(k+1) and c(k+2), wherein when the conditions (a), (f) and 0) are satisfied,
if frames between the destination point p and c(k) are in the buffer, then the point p is the feasible point,
otherwise the later nearest point q that frames between q and c(k) is in the buffer is the feasible point having smallest point value.

8. A Video-on Demand client system to prefetch segments of video data streams through multiple communications channels of data-centered broadcasting network from a video data server for implementing VCR functions including at least playback the segments, said client system comprising:

at least one loader to download the segments of the video stream from the video data server;

at least one buffer to store the downloaded segments from said loader;

a player to playback the segments read from said buffer, said player being responsive to VCR function commands given through user-interface thereof;

a playback pointer to issue playback commands to said player for designating a playback starting point of the segment in said buffer; and a prefetch manager to issue prefetch commands to said loader for prefetching the segments from the server based on the current playback point of the segment in said buffer so as to keep the playback point designated by said pointer within predetermined range of said buffer, wherein according to size of the broadcasting segment through the channels of the network from the server to the client, said playback pointer designates the feasible playback starting point for a destination frame point p of the segment designated by VCR function commands, where k is defined as natural number;

b(k) is defined as a beginning frame point of segment No. k;

e(k) is defined as an end frame point of segment No. k;

c(k) is defined as a current broadcasting frame point of segment No. k;

K is defined as numbers of channels and divided into segments of a set of video data streams of each video of length;

point value of b(k) equals to 0 as an offset value, (1<=k<=K);

condition (k): the destination point p is located after the current broadcasting point c (k) of the segment k broadcasting in channel k, wherein when the condition (k) is satisfied, frames between the destination point p and c(k) are considered as frames between p and e(k−1) and frames between b(k) and c(k) so that the destination point p is considered to be located at or before broadcasting point c(k) of the segment k broadcasting in channel k.

* * * * *

UNITED STATES PATENT AND TRADEMARK OFFICE
CERTIFICATE OF CORRECTION

| | |
|---|---|
| PATENT NO. | : 6,993,787 B1 |
| APPLICATION NO. | : 09/578739 |
| DATED | : January 31, 2006 |
| INVENTOR(S) | : Ibrahim Kamel et al. |

It is certified that error appears in the above-identified patent and that said Letters Patent is hereby corrected as shown below:

Title page,
Item [75] Inventors, add -- Zongming Fei, Atlanta GA (CN) --.

Column 14,
Line 52, "O)" should be -- (j) --.

Signed and Sealed this

Twentieth Day of June, 2006

JON W. DUDAS
*Director of the United States Patent and Trademark Office*